Oct. 10, 1950  W. L. WORDEN ET AL  2,525,007
WELL CASING CUTTER

Filed May 25, 1948  2 Sheets-Sheet 1

INVENTOR.
William L. Worden
Earl G. Lee
BY
McMorrow, Berman & Davidson
ATTORNEYS Oct. 10, 1950  W. L. WORDEN ET AL  2,525,007
WELL CASING CUTTER
Filed May 25, 1948  2 Sheets-Sheet 2
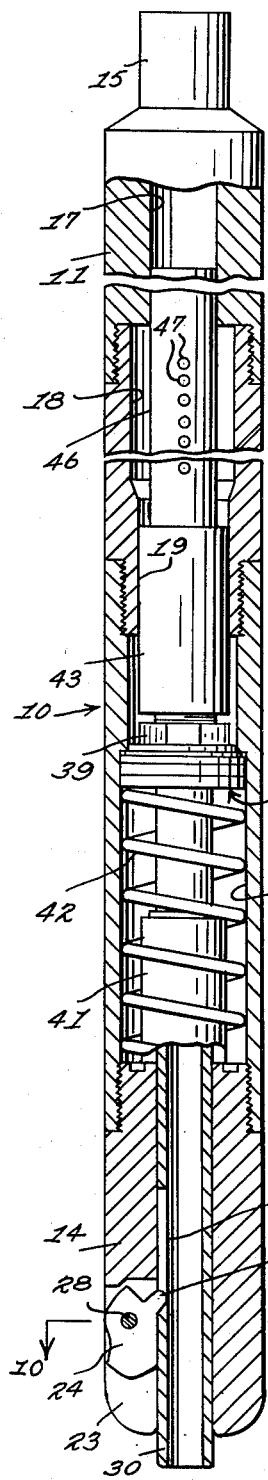
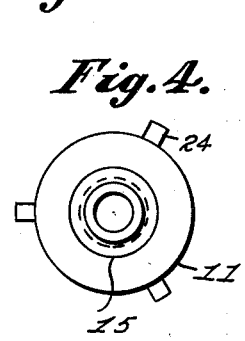
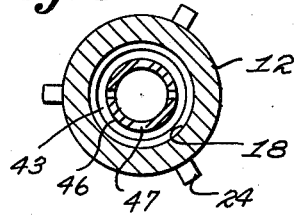
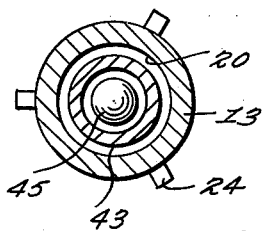
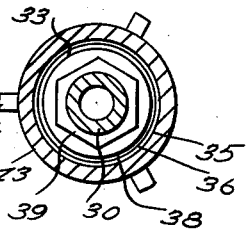
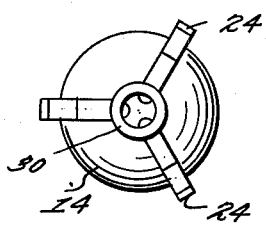
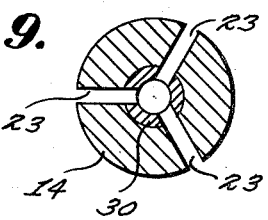
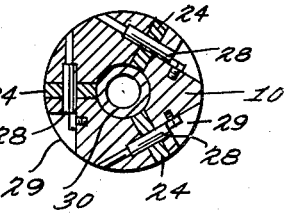
INVENTOR.
William L. Worden
BY Earl G. Lee
McMorrow, Berman & Davidson
ATTORNEYS Patented Oct. 10, 1950

2,525,007

UNITED STATES PATENT OFFICE 2,525,007

WELL CASING CUTTER

William L. Worden, Olney, and Earl G. Lee, Fairfield, Ill.

Application May 25, 1948, Serial No. 29,038

4 Claims. (Cl. 164—.8)

This invention relates to improvements in casing cutters and more particularly to an improved cutter for cutting apart the casing of a deep well, such as an oil or sulphur well, at a great distance below the top of the well.

It is among the objects of the invention to provide a rotatable casing cutting tool which may be lowered into the well to the desired depth and rotated in operative position in the well by the conventional well equipment, which is actuated from inoperative condition to operative, cutting condition by compressed air supplied from the top of the well, which may be lowered through fluid contained in the well, which is operative to cut in an upward direction to avoid fouling by the metal chips removed from the casing, and which is simple in construction, economical to manufacture, easy to use and does not require a supply of water for its operation.

Other objects and advantages will become apparent from a consideration of the following description and the appended claims in conjunction with the accompanying drawings, wherein:

Figure 3 is a longitudinal medial cross-section similar to Figure 2 showing the parts of the cutter in a different operative position;

Figure 4 is a top plan view of the cutter illustrated in Figure 1;

Figure 5 is a transverse cross-section on the line 5—5 of Figure 2;

Figure 6 is a transverse cross-section on the line 6—6 of Figure 2;

Figure 7 is a transverse cross-section on the line 7—7 of Figure 2;

Figure 8 is a bottom plan view of the cutter with the cutting blades in projected position as illustrated in Figure 2;

Figure 9 is a transverse cross-section on the line 9—9 of Figure 2; and

Figure 10 is a transverse cross-section on the line 10—10 of Figure 3.

Figure 1:
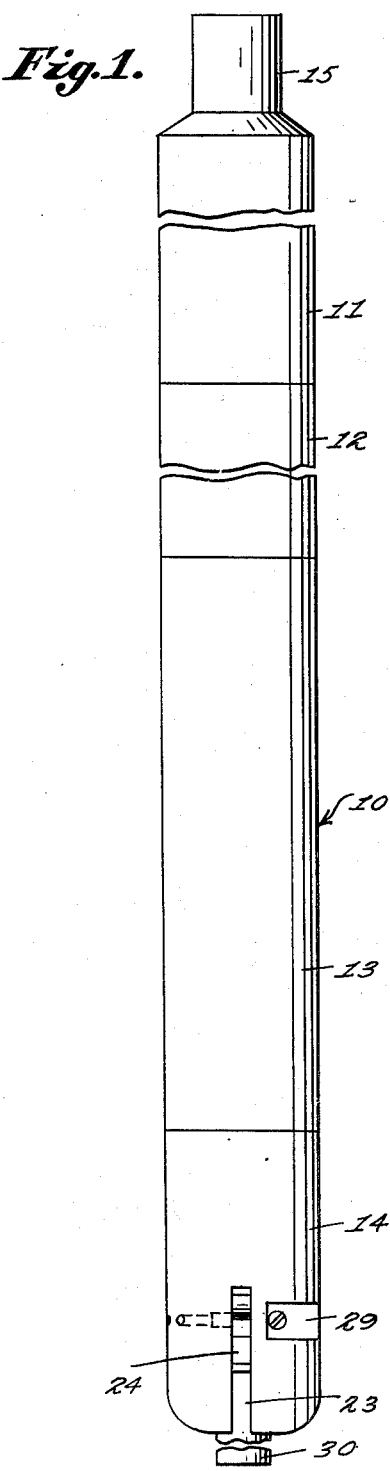
Figure 1 is a longitudinal elevation of a casing cutter illustrative of the invention.

With continued reference to the drawings, the improved cutter comprises an outer, cylindrical, hollow casing, generally indicated at 10 and comprising four separable parts 11, 12, 13 and 14 secured together in end-to-end relationship by telescopically-associated screw-threaded portions.

A hollow, internally screw-threaded boss 15 is provided on one end of the casing 10 and is formed integrally with the casing portion 11. A bore 16 leads from the interior boss 15 to the adjacent end of a counter-bore 17 which terminates at the end of portion 11 opposite the boss 15. A cylindrical chamber 18 is provided in the end of part 12 secured to part 11 and a valve bore 19 smaller than chamber 18 is provided in the opposite end of part 11. A cylindrical chamber 20 is provided in the portion of part 13 adjacent the associated end of part 12 which chamber is somewhat larger in diameter than the valve bore 19, and an internal cylinder 21 is provided in the part 13 extending from the inner end of chamber 20 to a location adjacent the end of part 13 remote from part 12. An axial bore 22 extends through part 14 and this part is provided with a plurality of angularly-spaced, longitudinally-extending slots 23 which extend from the outer end thereof toward the adjacent end of part 13 but for only a fraction of the total length of part 14.

A plurality of cutting blades 24 are pivotally mounted, one in each of the slots 23 for swinging movement into and out of the slots to retract and project the blades.

Each blade is provided on one end with a cutting edge 25 having a portion directed upwardly and outwardly and a portion directed downwardly and outwardly so that the blades will cut in either an upward or downward direction depending upon whether the tool is raised or lowered during the cutting operation. An outwardly extending tongue 26 is provided on the opposite end of the blade and disposed at one end of the inner wall 27 of a notch provided in this end of the blade.

Each blade 24 is pivotally secured in the respective slots 23 of the casing by a pivot pin 28 which extends from the inner end of a radial recess 29 in the outer surface of the casing part 14 through the notch and into the wall of the casing part 14 at the opposite side of the notch.

A tubular plunger 30 extends slidably through the bore 22 in casing part 14 and into the cylinder 21 in casing part 13. This plunger is provided adjacent its outer end with slots 31 which receive the tongues 26 of the corresponding blades 24 so that when the plunger is moved outwardly of the casing the blades are rotated to their projected position, as illustrated in Figure 2, in which the straight sides 27 of the notches at the inner ends of the blades bear against the outer surface of the tubular plunger to firmly support the blades in their projected position, the inner ends of notches 23 bearing on the tongues 26 so that the blades cannot move in either direction about their pivot pins 28.

When the plunger 30 is moved inwardly of the casing the outer ends of notches 31 contact the tongues 26 and move the blades to their inoperative or retracted position in which the straight inner edges 32 of the blades bear against the outer surface of the plunger to firmly support the blades in their retracted position.

Figure 2:
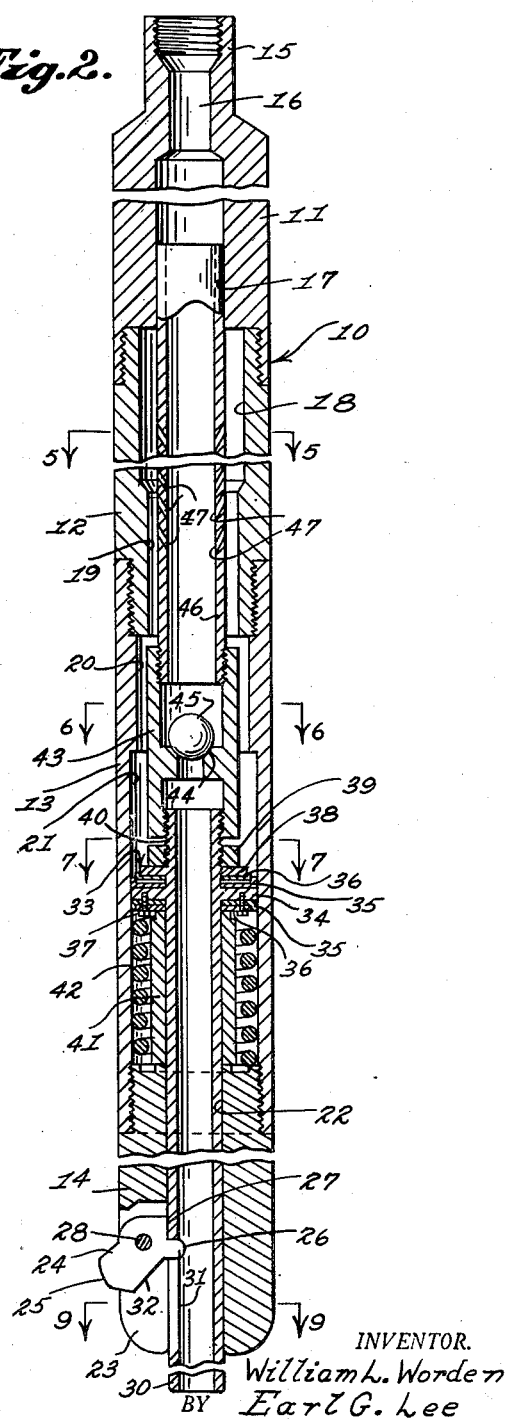
Figure 2 is a longitudinal medial cross-section of the cutter illustrated in Figure 1 with the parts thereof in operative position.

The diameter of the cylindrical casing 10 is substantially as great as the internal diameter of the well casing to be cut so that when the blades are projected relative to the casing to the position illustrated in Figure 2, they are brought into contact with the inner surface of the well casing and will cut an annular groove in the well casing as the cutting tool is rotated therein by rotation of the tubing string to which the tool is attached.

As the groove in the well casing is deepened the blades are further projected until the well casing is cut entirely through after which the upper portion of the well casing may be removed if desired. The boss 15 is adapted to be threaded onto the lower end of a string of tubing by means of which the tool is lowered into the well and this tubing is rotated at the top of the well by conventional drill-stem rotating mechanism to rotate the tool in the well and thereby impart a casing cutting rotational movement to the blades 24.

Blade projection movement is imparted to the plunger 30 by compressed fluid acting upon a piston, generally indicated at 33, secured on plunger 30 and slidable in cylinder 21. In order to conveniently provide this piston an external annular flange 34 is provided on plunger 30 which flange has an outside diameter substantially equal to the inside diameter of cylinder 21. Annular cups 35 of suitable material, such as leather, are disposed one at each side of the flange 34, and cup-washers 36 surround the plunger one at the outer side of each cup 35. The lower washer 36 is secured to the flange by suitable means, such as the screws 37, and the upper washer is held in operative position by a compression washer 38 held thereon by a nut 39 threaded onto the external screw threads provided on the inner end of the plunger.

A tubular spacing sleeve 41 surrounds the plunger 30 with its adjacent end bearing upon the inner end of casing part 14 and is of a length to contact the adjacent side of piston 33 and stop the blade projecting movement of plunger 30 when the blades have been fully projected, as illustrated in Figure 2.

A coiled compression spring 42 surrounds the sleeve 41 and bears at one end upon the inner end of the bottom casing part 14 and at its upper end on the underside of piston 33 to resiliently urge the plunger in its blade-retracting direction. The strength of this spring is such as to preclude projection of the cutting blades except when compressed fluid, such as compressed air, led from a suitable compressor at the top of the well through the string of tool-supporting tubing and through the hollow interior of the casing is applied to the piston 33.

A cylindrical valve body 43 is threaded at one end on to the threads 40 on the inner end of plunger 30 and is provided internally with a valve seat 44 for a valve ball 45 which seat and ball provides a check valve adjacent the inner end of the tubular plunger 30 so that the compressed fluid cannot flow from the interior of the casing 10 through the tubular plunger. The valve body 43 has an outside diameter which closely fits the valve bore 19 and closes the passage through this valve bore when the parts are in blade-retracting position, as illustrated in Figure 3.

The valve body 43 is provided in its end opposite plunger 30 with internal screw-threads which receive the externaly screw-threaded adjacent end of a tubular guide 46 which extends from the valve body 43 into the counter-bore 17 in which it is slidably received. This tubular guide 46 is provided, intermediate its length, with apertures 47 through the wall thereof for the passage of compressed fluid therethrough.

If the tool encounters fluid as it is being lowered into the well such fluid may pass through the tubular stem 30, the check valve 45, the tubular guide 46, the counter-bore 17 and bore 16, into the string of tubing to which the tool is secured.

If the depth of the fluid in the well is sufficient, some of this fluid may overflow the top of the tubing string and be returned to the well above the cutting tool. This fluid will, however, be unable to project the cutting blades since the valve body 43 fitting in the valve bore 19 when the blades are in their retracted position, obstructs this fluid from contact with the piston 33 and, as the upper shoulder of the valve body surrounding the tubular guide 46 has a very small area, the force exerted by spring 42 is sufficient to maintain the blades in retracted position.

When the tool has been lowered to the desired level, compressed fluid, such as compressed air from a conventional air compressor, is applied to the upper end of the tubing string and applies pressure downwardly through this string and to the interior of the casing 10. If there is liquid in the casing at the time this liquid will be utilized to actuate the piston 33 but if there is no liquid in the casing the compressed air itself will be applied to the piston. From the tubing string the compressed air, if there is no liquid in the casing, passes through the bore 16 and counter-bore 17 and into the tubular guide 46 and acts on the ball 45 to close the check valve so that it cannot flow out of the casing through the tubular stem 30. The compressed air then flows through the apertures 47 in the tubular guide and, by acting on the upper end of valve body 43 and on the check vale 45 simultaneously, forces valve body 43 downwardly out of the valve bore 19 so that the compressed air can then flow through the annular channel between the valve bore and the tubular guide and between the annular chamber 20 and the valve body 43, as illustrated in Figure 2, to the upper end of cylinder 21.

The compressed air then acts upon the upper side of piston 33 forcing plunger 30 downwardly or outwardly of the casing against the force of spring 42 and projecting the blades 24. The cutting tool is then rotated in the well and the blades cut an annular groove in the inner side of the well casing, additional compressed air being supplied to continue the projection of the blades until the casing is cut entirely through.

Preferably, as the cutting of the casing proceeds an upward force is applied to the cutting tool so that the casing is cut upwardly rather than downwardly. This not only causes the metal chips removed from the casing to fall away from the blades to thus avoid fouling of the blades but also permits an even, predetermined cutting pressure to be applied to the blades so that the blades are not broken or rapidly worn away by excessive cutting pressure applied thereto.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A well casing cutter comprising a hollow, cylindrical casing rotatable in the well and having a screw-threaded boss at one end for attachment to the lower end of a string of tool-supporting tubing, and angularly spaced, longitudinally extending slots in the opposite end thereof, cutting blades pivotally mounted, one in each of said slots for movement of their cutting edges inwardly and outwardly of said casing, a tubular plunger in the portion of said casing adjacent the slotted end thereof operatively engaging said blades to project and retract the latter upon movement of said plunger outwardly or inwardly of said casing, a piston on said plunger slidable in said casing, a spring in said casing operatively engaging said plunger to resiliently urge the latter in a blade-retracting direction, said casing having a valve bore therein, a valve body carried by said plunger and received in said valve bore when said cutting blades are retracted to preclude the application of pressure to said piston in a direction to project said blades, a tubular guide secured to said valve body and slidable in a counter-bore adjacent the boss-equipped end of said casing, said guide having apertures in the wall thereof for the passage of compressed fluid from the interior of said guide to the space within said casing surrounding said guide, and a check valve at the inner end of said plunger to block the flow of compressed fluid through said tubular plunger so that fluid under pressure can be applied to said plunger and said valve body to move said valve body out of said valve bore and apply the fluid pressure and the pressure of well fluid to said piston to project said blades.

2. A well casing cutter rotatable in a well casing comprising a hollow cylindrical casing having on one end a screw-threaded boss adapted to operatively engage the lower end of a tubing string and having in its opposite end angularly spaced, longitudinally extending slots, said casing also having an internal cylinder adjacent the slotted end thereof, a counter-bore adjacent the boss-equipped end thereof, and a valve bore adjacent said counter-bore, cutting blades pivotally mounted one in each of said slots, a tubular plunger extending slidably through the slotted end of said casing and operatively engaging said blades to project and retract the latter upon movement of said plunger outwardly and inwardly of said casing, a piston on said plunger slidably in said casing cylinder and operative to move said plunger in its blade-projecting direction upon application of compressed fluid to said piston, a spring in said casing resiliently urging said plunger in its blade-retracting direction, a valve body on the inner end of said plunger positioned in said casing valve bore when said plunger is in blade-retracting position to interrupt the fluid passage through the interior of said casing from said boss to said piston, a tubular guide extending from said valve body into said counter-bore and having apertures in the wall thereof for the passage of compressed fluid from the interior of said tubular guide to said piston, and a check valve in said valve body blocking the flow of compressed fluid through said tubular plunger.

3. A well casing cutter comprising an elongated casing having a bore extending therethrough and providing a counter bore, a chamber, a valve bore, a cylinder and a plunger receiving bore, said casing having at one end a screw threaded boss surrounding said bore and having at its opposite end angularly spaced apart slots extending longitudinally of said casing a short distance relative to the total length of the casing, a cutting blade pivotally mounted in each slot, a tubular plunger slidably mounted in said plunger receiving bore and engaging said blades to project said blades upon movement of said plunger in a direction toward the slotted end of said casing and retract said blades upon movement of said plunger in the opposite direction, a piston secured on said plunger and slidably received in said cylinder, a hollow valve body secured to said plunger and slidably received in said valve bore in position to preclude flow of fluid to the adjacent end of said cylinder when said plunger is in blade retracting position, said tubular plunger precluding flow of fluid to the opposite end of said cylinder, a tubular guide secured at one end to said valve body and extending through said chamber and slidably received in said counter bore, said guide having apertures therein for the passage of fluid from the interior of said tubular guide into said chamber to act on the end of said valve body surrounding said guide and urge said plunger in a blade projecting direction, a spring acting against the side of said piston opposite said valve body to resist movement of said plunger by the pressure of well fluid on the end of said valve body, and a check valve in said hollow valve body for the application of external fluid pressure to the latter to assist the pressure of the well fluid on the end of said valve body in overcoming the force of said spring and moving said valve body to a position at which said chamber is connected to said cylinder for the application of well fluid pressure and external fluid pressure to said piston to project said blades and exert cutting pressure thereon.

4. A well casing cutter comprising an elongated casing having a bore extending therethrough and providing a counter bore, a chamber, a valve bore, a cylinder and a plunger receiving bore, said casing having at one end a screw threaded boss surrounding said bore and having at its opposite end angularly spaced apart slots extending longitudinally of said casing a short distance relative to the total length of the casing, a cutting blade pivotally mounted in each slot, a tubular plunger slidably mounted in said plunger receiving bore and engaging said blades to project said blades upon movement of said plunger in a direction toward the slotted end of said casing and retract said blades upon movement of said plunger in the opposite direction, a piston secured on said plunger and slidably received in said cylinder, a hollow valve body secured to said plunger and slidably received in said valve bore in position to preclude flow of fluid to the adjacent end of said cylinder when said plunger is in blade retracting position, said tubular plunger precluding flow of fluid to the opposite end of said cylinder, a tubular guide secured at one end to said valve body and extending through said chamber and slidably received in said counter bore, said guide having apertures therein for the passage of fluid from the interior of said tubular guide into said chamber to act on the end of said valve body surrounding said guide and urge said plunger in a blade projecting direction, a spring acting against the side of said piston opposite said valve body to resist movement of said plunger by the pressure of well fluid on the end of said valve body, a check valve in said hollow valve body for the application of external fluid pressure to the latter to assist the pressure of the well fluid on the end of said valve body in overcoming the force of said spring and moving said valve body to a position at which said chamber is connected to said cylinder for the application of well fluid pressure and external fluid pressure to said piston to project said blades and exert cutting pressure thereon, and a sleeve surrounding said plunger within said cylinder and engageable with said piston to provide a stop for movement of said plunger in a blade projecting direction.

WILLIAM L. WORDEN.
EARL G. LEE.

REFERENCES CITED

The following references are of record in the file of this patent:

UNITED STATES PATENTS

| Number | Name | Date |
|---|---|---|
| 967,650 | Locke | Aug. 16, 1910 |
| 1,788,579 | Lowrey et al. | Jan. 13, 1931 |
| 2,185,103 | Heigis | Dec. 26, 1939 |